United States Patent
Angelsen

(10) Patent No.: US 11,007,686 B2
(45) Date of Patent: May 18, 2021

(54) ULTRASOUND TRANSDUCER MATCHING LAYERS AND METHOD OF MANUFACTURING

(71) Applicant: Bjorn A. J. Angelsen, Trondheim (NO)

(72) Inventor: Bjorn A. J. Angelsen, Trondheim (NO)

(73) Assignee: SURF TECHNOLOGY AS, Trondheim (NO)

( * ) Notice: Subject to any disclaimer, the term of this patent is extended or adjusted under 35 U.S.C. 154(b) by 993 days.

(21) Appl. No.: 14/872,931

(22) Filed: Oct. 1, 2015

(65) Prior Publication Data

US 2016/0096294 A1    Apr. 7, 2016

Related U.S. Application Data

(60) Provisional application No. 62/058,236, filed on Oct. 1, 2014.

(51) Int. Cl.

| | |
|---|---|
| *B06B 1/02* | (2006.01) |
| *B29C 43/00* | (2006.01) |
| *G10K 11/02* | (2006.01) |
| *B06B 1/06* | (2006.01) |
| *B29K 103/00* | (2006.01) |
| *B29L 31/34* | (2006.01) |

(52) U.S. Cl.
CPC .............. *B29C 43/003* (2013.01); *B06B 1/02* (2013.01); *B06B 1/0644* (2013.01); *G10K 11/02* (2013.01); *B29K 2103/00* (2013.01); *B29K 2995/0005* (2013.01); *B29K 2995/0007* (2013.01); *B29K 2995/0013* (2013.01); *B29L 2031/34* (2013.01)

(58) Field of Classification Search
CPC ......... B06B 1/067; B06B 1/0618; B06B 1/02; B06B 1/0644; B29C 43/003; B29C 70/88; B29C 70/882; G10K 11/02
USPC .................................. 310/327–328; 264/104
See application file for complete search history.

(56) References Cited

U.S. PATENT DOCUMENTS

| | | |
|---|---|---|
| 4,229,812 A | 10/1980 | Holloway |
| 4,336,173 A | 6/1982 | Ugelstad |
| 4,459,378 A | 7/1984 | Ugelstad |
| 6,183,578 B1 | 2/2001 | Ritter et al. |
| 2007/0205698 A1 | 9/2007 | Chaggares et al. |

*Primary Examiner* — Jeffrey M Wollschlager
*Assistant Examiner* — Xue H Liu
(74) *Attorney, Agent, or Firm* — Cozen O'Connor

(57) ABSTRACT

An acoustic matching layer where the thickness is defined by a single layer of defined mono-disperse particles. The layer comprises a polymer base in which mono-disperse particles are embedded. The mono-disperse particles can be coated with a solid material that participates in the definition of the acoustic impedance of the layer. The polymer base can include smaller solid particles that participates in the definition of the acoustic impedance of the layer. The invention also provides a method of manufacturing.

9 Claims, 4 Drawing Sheets

ULTRASOUND TRANSDUCER MATCHING LAYERS AND METHOD OF MANUFACTURING

FIELD OF THE INVENTION

This application claims the benefit under 35 U.S.C. § 119(e) of U.S. Provisional Patent Application Ser. No. 62/058,236, filed on Oct. 1, 2014, which is incorporated by reference herein in its entirety.

The invention addresses design and manufacturing methods of acoustic matching layers of ultrasound transducers for simplified and efficient manufacturing of the layers, and also improved heat conductivity of the layers.

BACKGROUND

The electro-acoustic transduction of current ultrasound transducer arrays is based on one of:
  i) composites of polymers and ferroelectric ceramic materials, and
  ii) vibrating membranes on the surface of a substrate material, such as Si, where the electro-mechanical coupling is either capacitive (cmut) or through layers of piezoelectric material (pmut).

To shape the bandwidth of the electro-acoustic transduction, acoustic layers with quarter wave ($\lambda/4$) thickness at the center of the acoustic band and specified acoustic impedance are used. The specified acoustic impedance is obtained by mixing solid particles of various types (e.g. W, Al, ceramics, glass, etc.) into a polymer resin, and defined layer thickness is generally obtained with grinding of the layer. To obtain correct thickness, the grinding is interrupted several times to measure the thickness before the desired thickness is obtained. This process is hence time-consuming and expensive, and the current invention presents a solution for simpler manufacturing of the matching layers with defined acoustic impedance and thickness.

SUMMARY OF THE INVENTION

The inventors has realized that it is desirable to improve the manufacturing methods of a composite polymer material comprising a polymer base with particles to obtain a predetermined thickness and acoustic impedance of the composite material. An overview of the invention is presented. The overview is a short form and by no means represents limitations of the invention, which in its broadest aspect is defined by the claims appended hereto.

The thickness of the matching layer is according to the invention defined by a single layer of mono-disperse polymer particles. The particles are mixed into a polymer resin that can contain further smaller particles to define the acoustic impedance. The mixture is before and during curing pressured between two conformal surfaces so that one obtains a single layer of the mono-disperse polymer particles between the conformal surfaces, defining the final thickness of the layer. After curing, we obtain a polymer layer containing particles where the thickness is defined by a single layer of the mono-disperse particles, and a shape defined by the shape of the conformal surfaces. The conformal surfaces can typically be planar or curved in one or two dimensions for adaptation to the shape of the ultrasound array.

The mono-disperse polymer particles can also according to the invention be covered with a surface layer of solid material that participates in the definition of the acoustic impedance of the composite layer. A metal surface layer, e.g. Ag, Au, Al or Cu, can be used to also make the matching layer electrically and thermally conductive, for example to use the matching layer for electrical ground and shielding and improved cooling of the transducer array. Increased thermal conductivity with electrical isolation can be obtained by coating the metal layer with an electrically isolating layer, or the whole surface layer is made of an electrically isolating material with high thermal conductivity, e.g. AlN, BeO.

DETAILED DESCRIPTION OF EMBODIMENTS

According to an embodiment there is provided an ultrasound transducer array probe arranged as a layered structure comprising at least one layer of transducer array elements and at least one further layer mounted in acoustic contact with said layer of transducer elements. The further layer is a composite material layer comprising a polymer base and a single layer of mono-disperse particles that defines the thickness of said further layer.

Figure 1:
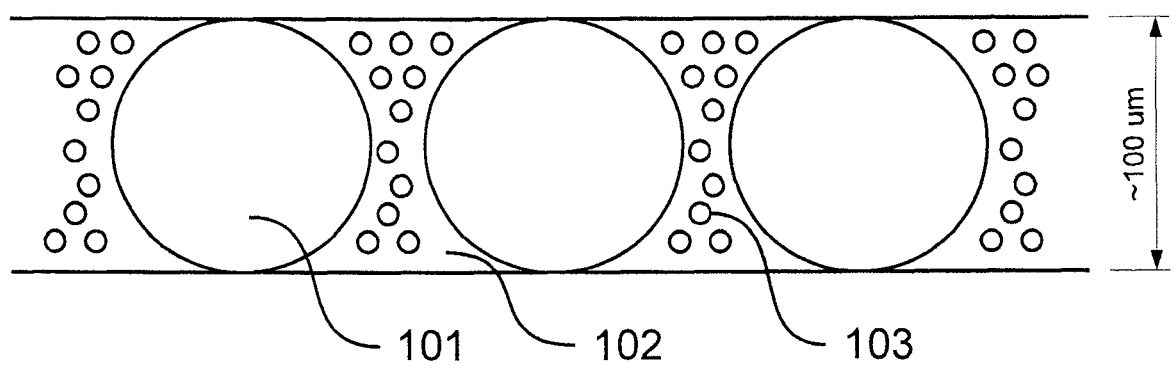
FIG. 1 Illustrates a single layer of mono-disperse polymer particles defining the thickness of an acoustic matching layer and the use of smaller particles that participates in the definition of the acoustic impedance of the matching layer.

An example embodiment according to the invention is shown in FIG. 1, where 100 shows the composite acoustic matching layer composed of a single layer of mono-disperse particles 101 in a polymer resin 102. The polymer resin may also contain smaller particles 103 of solid material to define the acoustic impedance of the layer.

Polymer particles with a size distribution around a defined average in the range of ~2-200 µm can be manufactured, and such polymer particles are commercially available, for example from Dow Chemical Company. Mono-disperse polymer particles with diameters in the range of 2-200 µm can be manufactured with methods for example as described in U.S. Pat. Nos. 4,336,173 and 4,459,378, and such polymer particles are commercially available, for example from Conpart AS. The particles can be made of polymers with characteristic bulk acoustic impedance of the raw material typically in the range of 1.5-3.5 $10^6$ kg/m$^2$s. The polymer particles can be made from for instance styrene, e.g. styrene cross-linked with divinylbenzene. Other styrene monomers of use in the invention include methylstyrene and vinyl toluene. Mixtures of styrene monomers may be used. Another option is particles prepared from acrylic acid esters, methacrylic acid esters, acrylic acids, methacrylic acids, acrylonitrile, methacrylonitrile, vinyl chloride, vinyl acetate and vinyl propionate. Mixtures of any of these monomers can also be used optionally together with the styrene monomers above. All monomers can be cross-linked with divinylbenzene or a diacrylic monomer such as ethane-diol-diacrylate. Some particles may require treatment with base to hydrolyze ester groups to allow cross-linking. The use of a cross-linking agent and hence the formation of a cross-linked particles is preferred.

According to an embodiment of the invention, the polymer particles are coated with surface layers of stiffer materials to manipulate the total stiffness of the particles that can be used to define the acoustic impedance of the layer. The surface layer might be of a material of high electrical (>10 MS/m) and thermal (>50 W/mK) conductivity, for example the metals like Ag (63,429), Cu (58, 401), Au (45, 318), Al (35, 237), Mg (23, 156), Ni (14, 91), or the electrically isolating materials AlN (very low, 285), BeO (very low, 330), where the numbers in parenthesis is the electrical and thermal conductivity of the material in MS/m and W/mK. The electrical semiconductor Si has a high thermal conductivity of 149 W/mK with very low electrical conductivity for un-doped Si. Such layers will influence the total electrical or thermal conductivity of the matching layer. An electrically conducting matching layer can be used for electrical grounding and shielding purposes of the transducer array, while a thermally conducting matching layer can be used for improved cooling of the transducer assembly. Metal surface layers can hence be used for both.

By increasing the thickness of the coating surface layer, the bulk stiffness of the spheres can be increased above that of the polymer core, depending on the type of coating material and surface layer thickness. This can be used to increase the acoustic impedance of the matching layer. To reduce the stiffness of the particles, the polymer core can be made porous, with a porosity of ~5-75%, where increased porosity will lower the acoustic impedance of the matching layer. Particles with dimensions down to ~200 nm can also be manufactured and coated with both metal and electrically isolating, thermally conductive material.

Figure 2:
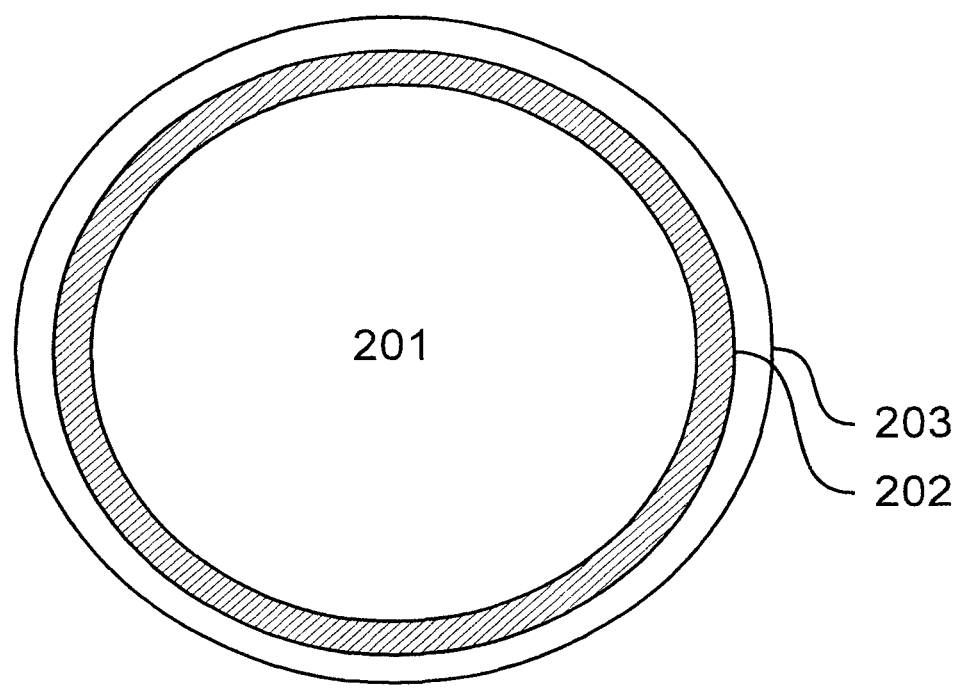
FIG. 2 Illustrates a heat conducting mono-disperse sphere comprising a polymer core covered with heat conducting layers.

An example of a mono-disperse particle with combined surface layer of metal and electrically isolating layer is shown as 200 in FIG. 2, where 201 shows a mono-disperse polymer core, 202 shows a surface layer of metal, and 203 shows an outer surface layer of electrically isolating material.

The smaller particles 103 are useful for adjustments of the acoustic impedance of the matching layer. These particles are so small that they find their space between the layer mono-disperse particles 101 without interfering with the definition of the layer thickness. The particles 103 can be of any shape, and does not have to be mono-disperse, but mono-disperse form is an interesting manufacturing method for defined dimension also for these particles.

Figure 3:
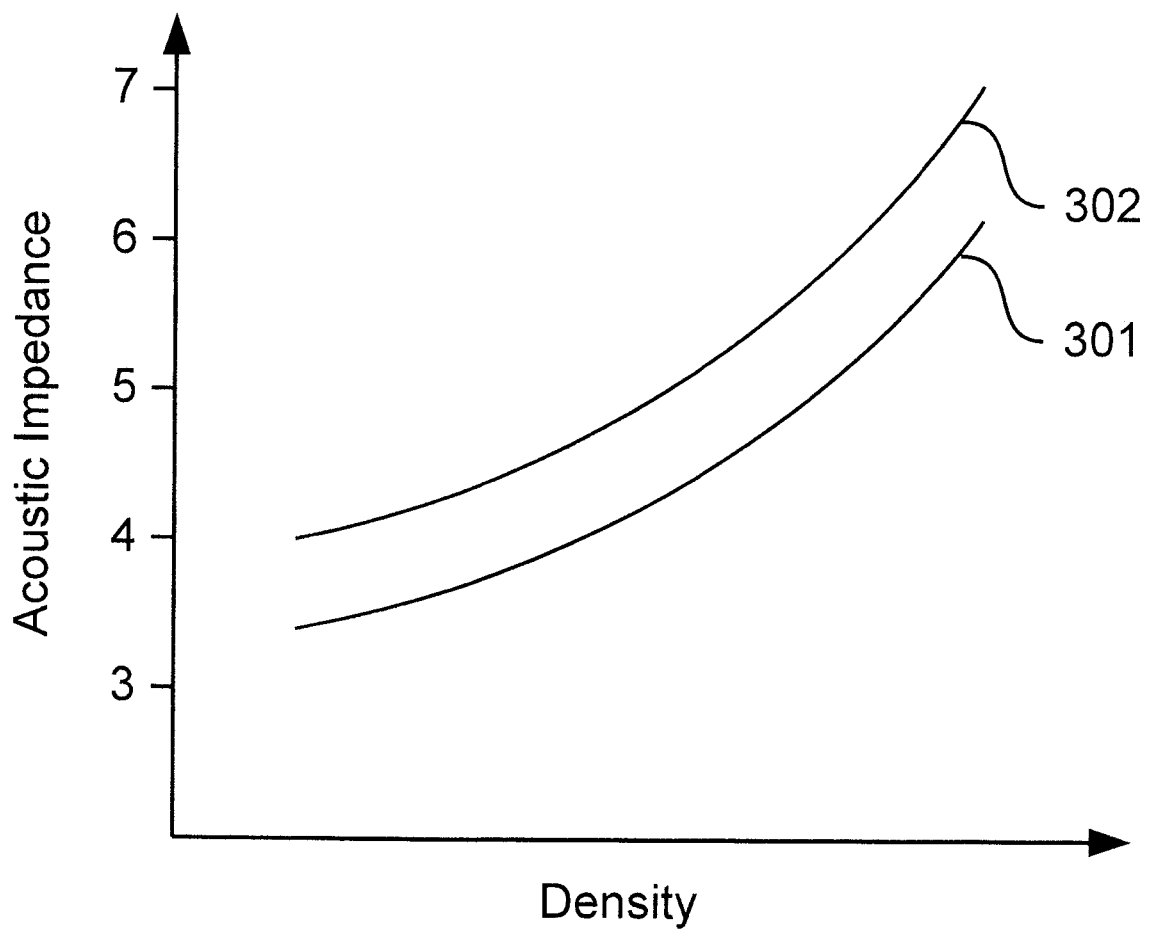
FIG. 3 Shows the variation of acoustic impedance of the composite material with relative volume fill of Ag of covering the surface of the mono-disperse polymer particles.

301 in FIG. 3 shows the variation of the acoustic impedance of the matching layer with the density of particles 103 made of tungsten (W) of average diameter ~2 µm. The mono-disperse particles are spheres of diameter 30 µm made of styrene polymer in a polymer resin. Introducing an Ag surface layer to the mono-disperse particles 101, increases the acoustic impedance of the layer to curve 302.

Figure 4A:
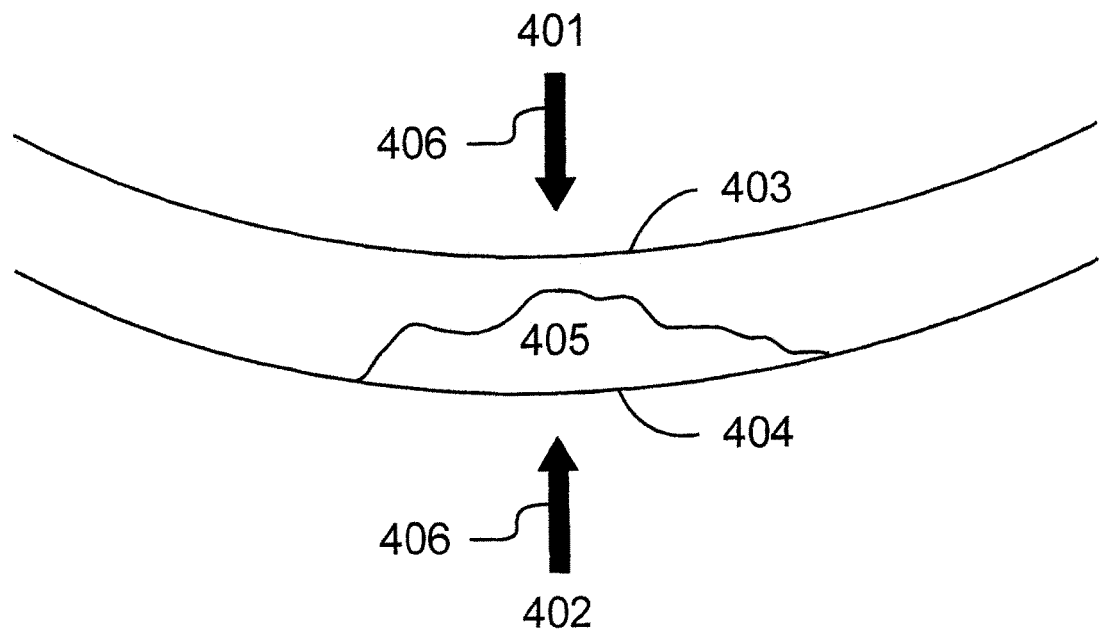
FIGS. 4A to 4D Show steps of a manufacturing method of one or more acoustic matching layers where the layer thickness is defined by a single layer of mono-disperse particles.
Figure 4B:
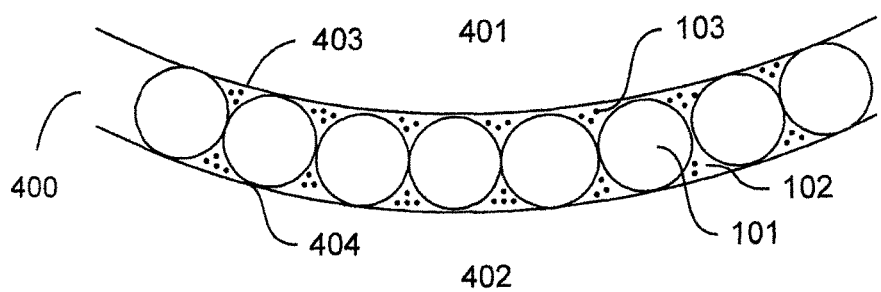
Figure 4C:
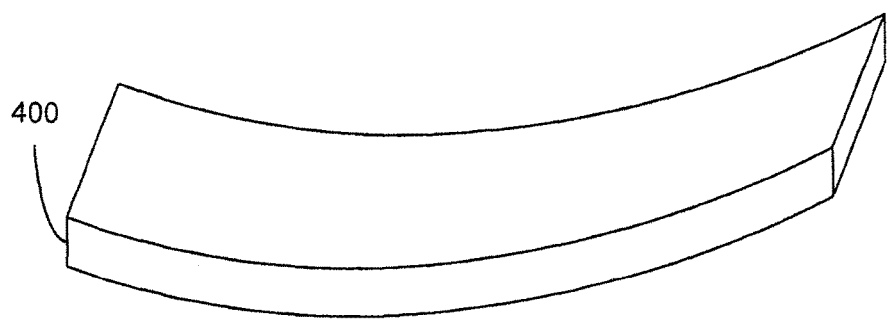

FIGS. 4A to 4D show by way of illustration steps of a manufacturing process of a matching layer 400 for a curved array. In FIG. 4A is shown two solid compression dies 401 and 402 with con-formal surfaces 403 and 404. In this particular example, a portion of mixture 405 of mono-disperse particles in a two-component polymer resin that also may contain the smaller particles 103, is placed on the lower compression die 402. The pressure compression dies 401 and 402 are then pressured together as indicated by the arrows 406 to the position shown in FIG. 4B so that the mixture 405 is squeezed out between the surfaces 403 and 404 so that a single layer of the mono-disperse particles 101 defines the thickness of the final matching layer 400 between the con-formal surfaces 403 and 404. Opening the distance between the compression dies 401 and 402 after curing of the polymer resin, then provides the self contained matching layer 400, shown in FIG. 4C, with defined thickness and acoustic impedance that can be glued to the transducer array. Using the curved ultrasound array as the compression die 401 allows direct gluing of the matching layer onto the array.

Figure 4D:
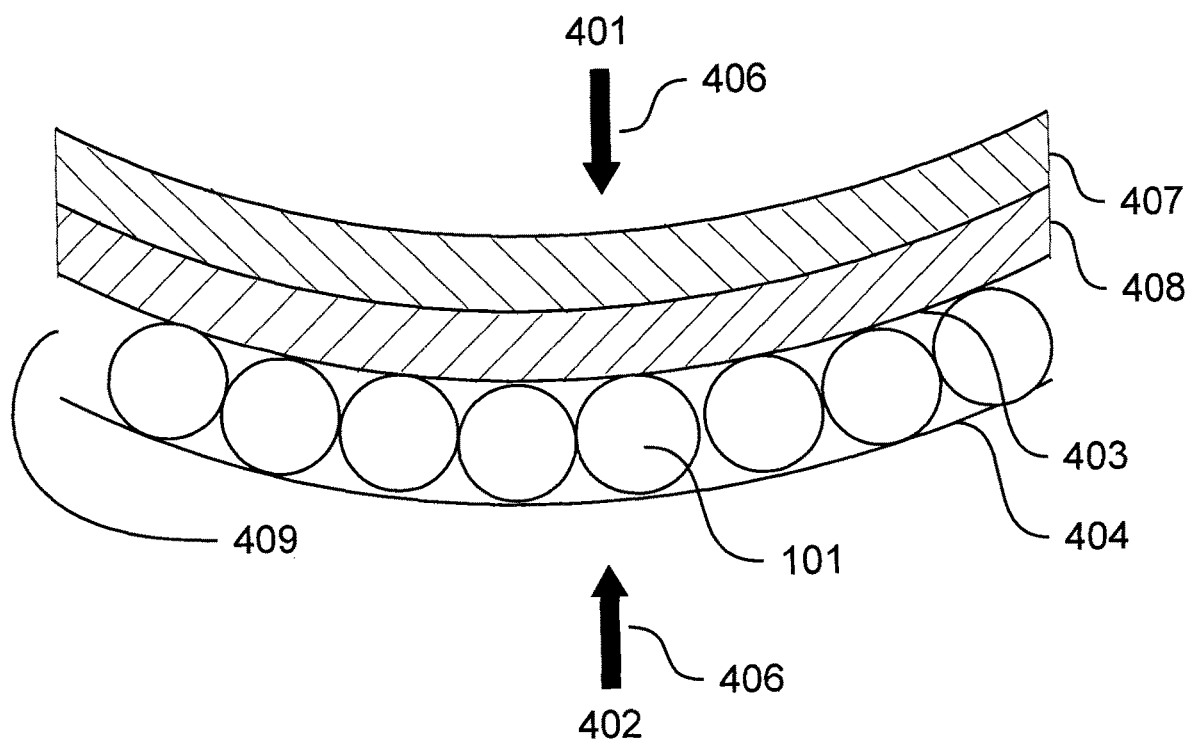

Using the curved ultrasound array 407 with an added first matching layer 408 as part of the compression die 401 as shown in FIG. 4D allows direct gluing of a $2^{nd}$ matching layer 409 onto the $1^{st}$ matching layer 408 on the curved array 407. The same method can also be used to glue new matching layers onto a prior matching layer(s) where for example the structure 407 and 408 are one or more prior matching layers. It is clear that one can also connect prior matching layers to the compression die 402 to build the matching layer structure in the opposite direction, and a backing structure of the transducer array 407 can be included in the compression die 401.

FIGS. 4A to 4D show by way of example the steps of manufacturing matching layers for a curved array, where it is clear for anyone skilled in the art that matching layers of any form can be manufactured by adaptation of the surfaces 403 and 404. As the matching layers are thin, one can also manufacture plane layers that can be adapted to a variety of curved arrays through bending of the manufactured matching layer 400 in FIG. 4C.

It is also convenient to increase the curing speed of the resin through selected remedies like for example heating, vibrations, etc. according to known methods of curing resins.

In the manufacturing process of the matching layers, it can be difficult to control the lateral distance between the mono-disperse particles 101. To reduce the sensitivity of the acoustic function of the matching layer to exactness and constance in this distance, it is advantages to make the mixture of polymer resin 102 and smaller particles 103 so that the acoustic impedance of this mixture is the same as that of the coated mono-disperse particles.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention.

It is also expressly intended that all combinations of those elements and/or method steps which perform substantially the same function in substantially the same way to achieve the same results, are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method of manufacturing layers for an ultrasound transducer, comprising:
   providing an electro-acoustic transduction layer of the ultrasound transducer; and
   forming an acoustic matching layer of the ultrasound transducer, such that a single layer comprising mono-disperse particles defines a thickness of the acoustic matching layer, and acoustic properties of a volume concentration of said mono-disperse particles contribute to a characteristic acoustic impedance of the acoustic matching layer.

2. The method according to claim 1, wherein in forming the acoustic matching layer, said mono-disperse particles are mixed into a polymer glue resin, and a sample of said mixture is pressured between conformal surfaces so that the sample is squeezed out so that a single layer of mono-disperse particles is left between said conformal surfaces, and curing of the polymer glue resin presents the acoustic matching layer with defined thickness.

3. The method according to claim 2, wherein in forming the acoustic matching layer, one of said conformal surfaces includes one of i) an ultrasound array, and ii) at least one prior acoustic matching layer.

4. The method according to claim 1, wherein in forming the acoustic matching layer, the mono-disperse particles comprises a surface layer of solid material designed to define one of the acoustic impedance of said mono-disperse particles and the acoustic impedance of the acoustic matching layer.

5. The method according to claim 4, wherein in forming the acoustic matching layer, said surface layer comprises one or both of i) an electrically conducting layer, and ii) a thermally conducting but electrically isolating material.

6. The method according to claim 2, wherein in forming the acoustic matching layer, particles other than the mono-disperse particles are also mixed into the polymer glue resin, where said other particles are sized smaller than the mono-dispersed particles to have lesser effect on defining the thickness of the acoustic matching layer as compared to the mono-dispersed particles, while contributing to the acoustic impedance of the acoustic matching layer.

7. The method according to claim 6, wherein in forming the acoustic matching layer, a type and density of said other particles mixed into the polymer glue resin are selected so that the characteristic acoustic impedance of the polymer glue resin mixture closely matches the characteristic acoustic impedance of said mono-disperse particles.

8. The method according to claim 2, wherein in forming the acoustic matching layer, a curing speed of the resin is increased through at least one of i) heating, and ii) vibrations.

9. The method according to claim 1, wherein in forming the acoustic matching layer, the thickness of the acoustic matching layers provides a quarter wave impedance inversion at essentially a central frequency of an operating band of the ultrasound transducer.

* * * * *